US 8,823,489 B2

(12) United States Patent
Liu

(10) Patent No.: US 8,823,489 B2
(45) Date of Patent: Sep. 2, 2014

(54) SYSTEMS AND METHODS FOR GENERATING A DERIVED BIOMETRIC TEMPLATE

(75) Inventor: Eric Liu, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 13/092,779

(22) Filed: Apr. 22, 2011

(65) Prior Publication Data

US 2012/0268246 A1 Oct. 25, 2012

(51) Int. Cl.
*G05B 19/00* (2006.01)
*G06K 9/00* (2006.01)
*G06K 9/62* (2006.01)
*G06F 21/00* (2013.01)
*G06F 21/32* (2013.01)

(52) U.S. Cl.
CPC .................................. *G06F 21/32* (2013.01)
USPC .......... 340/5.82; 340/5.52; 340/5.4; 382/115; 382/127; 382/181; 382/224; 713/186

(58) Field of Classification Search
CPC .......... G06K 9/00006; G06K 9/00536; G06K 9/00523; G06F 21/32; H04L 9/3231
USPC ................. 340/5.8, 5.52, 5.53; 382/115–127, 382/181–224; 713/186
See application file for complete search history.

(56) References Cited

U.S. PATENT DOCUMENTS

| 5,239,590 | A  | * | 8/1993  | Yamamoto      | 382/125 |
|-----------|----|---|---------|---------------|---------|
| 7,925,063 | B2 | * | 4/2011  | Ishida et al. | 382/124 |
| 2002/0061125 | A1 | * | 5/2002  | Fujii         | 382/125 |
| 2003/0217276 | A1 |   | 11/2003 | LaCous        |         |
| 2004/0042642 | A1 | * | 3/2004  | Bolle et al.  | 382/115 |
| 2009/0191846 | A1 |   | 7/2009  | Shi           |         |
| 2010/0133338 | A1 | * | 6/2010  | Brown et al.  | 235/382 |
| 2010/0138914 | A1 |   | 6/2010  | Davis et al.  |         |
| 2010/0192096 | A1 |   | 7/2010  | Barrett       |         |
| 2011/0068896 | A1 |   | 3/2011  | Xia           |         |
| 2012/0188055 | A1 | * | 7/2012  | Sahin et al.  | 340/5.82 |

OTHER PUBLICATIONS

Website ~ http://www.bromba.com/faq/biofaqe.htm ~ "Definitions of Biometric Terms" retrived Apr. 18, 2011 pp. 1-43.

* cited by examiner

*Primary Examiner* — George Bugg
*Assistant Examiner* — Munear Akki
(74) *Attorney, Agent, or Firm* — Kilpatrick Townsend & Stockton LLP

(57) ABSTRACT

Systems and methods for generating a derived biometric template are provided. A biometric sample of a user is determined. A base biometric template includes a plurality of features extracted from the biometric sample. A degree of rotation is determined, and a derived biometric template is generated using the degree of rotation.

20 Claims, 8 Drawing Sheets

SYSTEMS AND METHODS FOR GENERATING A DERIVED BIOMETRIC TEMPLATE

I. BACKGROUND

Computing devices may be integrated with biometric readers, often times, to increase security for access to the device which may contain sensitive information. Typically, biometric security systems allow a user to gain access if biometric information submitted by the user matches a previously established and stored template, which is a data representation of a source biometric sample. In some implementations, this is accomplished by an enrollment operation and a recognition operation. The operation of enrollment entails collecting, processing, and storing biometric information of an individual user. The operation of recognition entails detecting biometric information and comparing with the information stored at the enrollment stage.

During the enrollment operation of many biometric security systems, a user provides a source biometric sample of biometric data including, but not limited to, fingerprints, iris features, facial features, and voice information. This original biometric sample is processed and features are extracted. The features are used to generate a template against which biometric samples of users are compared for subsequent access.

There may be a tolerance associated with a template. Generally, tolerance indicates the degree of allowable difference between the characteristics or features of the user's biometric sample to components of the template. During the recognition operation of many biometric security systems, if the characteristics match the respective features of the template within a pre-determined tolerance, the user is authenticated for access to the device or particular components of the device. If, however, the characteristics of the user's biometric sample do not match the template, access is denied.

II. BRIEF DESCRIPTION OF THE DRAWINGS

The present disclosure may be better understood and its numerous features and advantages made apparent by referencing the accompanying drawings.

III. DETAILED DESCRIPTION

Figure 1:
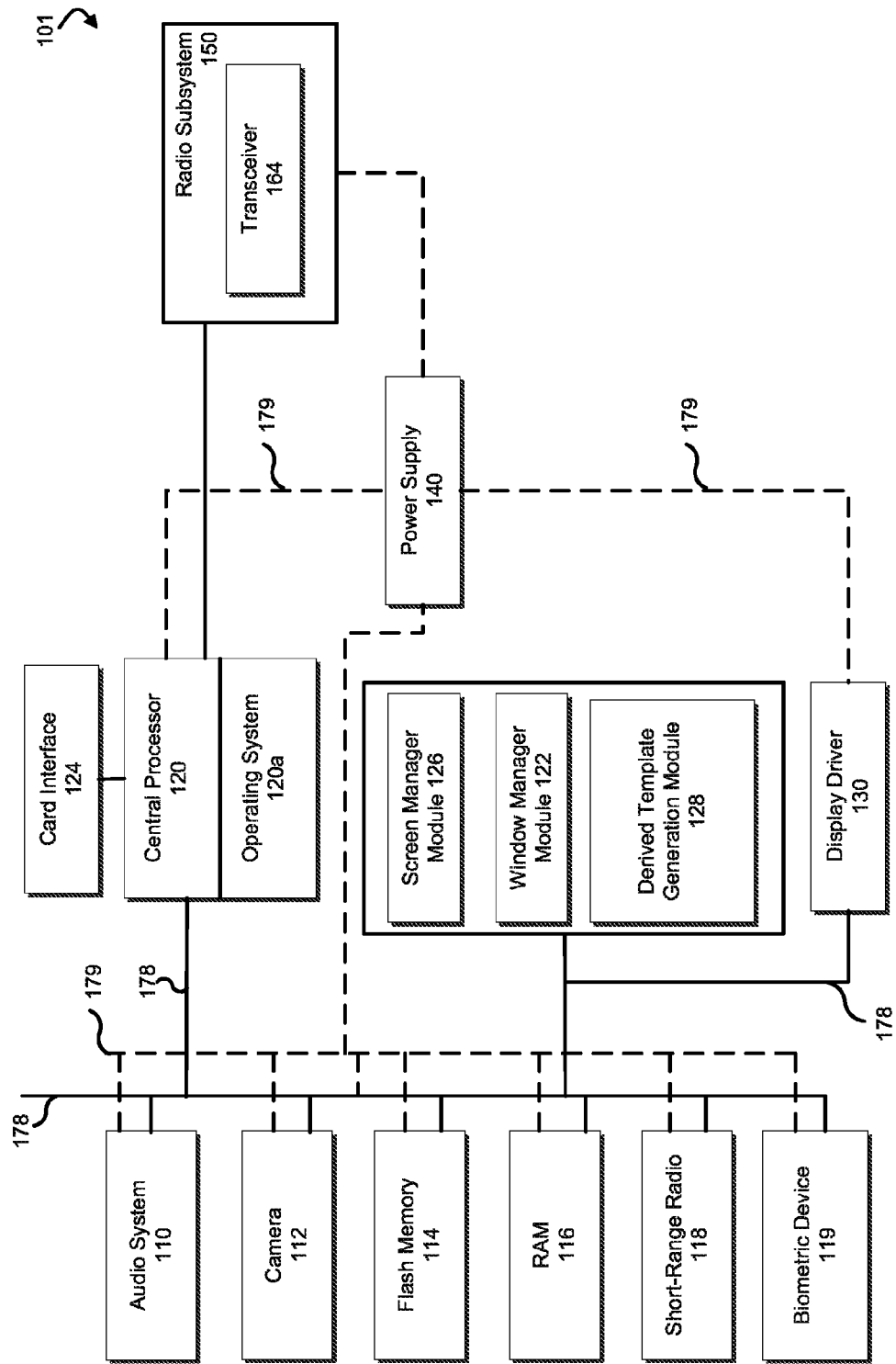
FIG. 1 is a block diagram of an architecture of a mobile device in accordance with an embodiment.

Embodiments described herein are useful with various types of biometric technology. Specific technologies include iris or retina eye-scan technology, voice technology, face technology, hand geometry technology, DNA technology, spectral biometric technology and fingerprint technology, for example. To the extent that the present description describes a fingerprint-based system, such description is intended to be but one example of a suitable system. The scope is not so limited.

In many cases, biometric systems include an optical, injected radio frequency (RF), or capacitive scanner disposed in a housing which provides a contact area where placed or swiped fingerprints are captured. As used herein, a biometric sample is a raw digital image of biometric data obtained from a biometric capture device (e.g., biometric scanner). A biometric sample is typically digitally processed for example to remove artifacts and background noise, normalize the data, etc. As used herein, a biometric sample refers to both the raw biometric data (e.g., digital image of a fingerprint) and a digitally processed biometric sample. A biometric template is a data representation of the relevant features (e.g., characteristics) extracted from a biometric sample. One purpose of extraction is to remove superfluous information which does not contribute to biometric recognition. The features that are deemed relevant vary among matching methodologies.

During an enrollment operation, a template is generated from the biometric sample, and is then stored. During a recognition operation, a recognition biometric sample is captured and the relevant features are extracted and compared for a possible match with the previously established and stored template. As used herein, a recognition biometric sample is a biometric sample that is collected during a recognition operation.

For proper operation, it may be a pre-requisite that the user place a finger in the correct position relative to the scanner device. Improper or partial placement of the designated finger relative to the contact area is likely to result in an unsuccessful match with stored templates. An integrated finger guide includes a channel which aids in the correct placement of the finger relative to the scanner or which guides the finger to make the correct motion relative to the scanner.

However, typical biometric systems, especially those suitable for mobile use in laptops, mobile phones, and other mobile devices, do not include placement guides. The limited space and design aesthetics of mobile devices limits the use of most placement guides with physical channels and large sensors. Often, the biometric systems on mobile devices do not work consistently. If a finger is swiped at a direction or angle different from what was used to generate the template during enrollment, the captured fingerprint may not be recognized. As such, multiple swipes of the user's finger are often collected in order for the fingerprint sensor to capture biometric data in the correct placement relative to the scanner.

Systems and methods for generating a derived biometric template are provided. A biometric sample of a user is determined. A base biometric template includes a plurality of features extracted from the biometric sample. A degree of rotation is determined, and a derived biometric template is generated using the degree of rotation.

This allows a user to be recognized regardless of the direction, placement, or orientation of the captured fingerprint relative to the sensor, without having to first program the sensor to recognize alternative directions.

FIG. 1 is a block diagram of an architecture of a mobile computing device 101, which is shown as, but not limited to, a device with telephonic functionality, in accordance with an embodiment. Mobile computing device 101 may be a mobile telephone, a personal digital assistant, a handheld computer, or other mobile computing device.

Mobile computing device 101 includes a central processor 120, a power supply 140, and a radio subsystem 150.

The central processor 120 is configured for operation with a computer operating system 120a. The operating system is an interface between hardware and an application, with which a user typically interfaces. The operating system is responsible for the management and coordination of activities and the sharing of resources of the mobile computing device 101. The operating system provides a host environment for applications that are run on the mobile computing device 101. As a host, one of the purposes of an operating system is to handle the details of the operation of the mobile computing device 101. Examples of an operating system ("OS") include PALM OS and PALM WEBOS, MICROSOFT WINDOWS (including WINDOWS 7, WINDOWS CE, and WINDOWS MOBILE), SYMBIAN OS, RIM BLACKBERRY OS, APPLE OS (including MAC OS and PHONE OS), GOOGLE OS (CHROME or ANDROID), and LINUX.

The central processor 120 communicates with an audio system 110, camera 112, flash memory 114, RAM 116, a short range radio module 118 (e.g., Bluetooth, Wireless Fidelity (WiFi) component (e.g., IEEE 802.11)), and a biometric device 119. The central processor 120 communicatively couples these various components or modules through a data line (or bus) 178. The power supply 140 powers central processor 120, radio subsystem 150 and a display driver 130 (which may be contact- or inductive-sensitive). The power supply 140 may correspond to a direct current source (e.g., a battery pack, including rechargeable) or an alternating current (AC) source. The power supply 140 powers the various components through a power line (or bus) 179.

The central processor 120 communicates with applications executing within mobile computing device 101 through the operating system 120a. In addition, intermediary components, for example, a window manager module 122 and a screen manager module 126, provide additional communication channels between the central processor 120 and operating system 120 and system components, for example, the display driver 130.

In one embodiment, the window manager 122 comprises a software or firmware module that includes instructions that initialize a virtual display space stored in the RAM 116 and/or the flash memory 114. The screen manager 126 comprises a software or firmware module that includes instructions that manages content displayed on a screen of mobile computing device 101.

Biometric device 119 comprises a software or firmware module that includes instructions that capture a digital image of an individual's biometric data (i.e., biometric sample), including, but not limited to, fingerprints, iris features, facial features, voice information, handwriting, and gait. Biometric device 119 is further configured to digitally process the biometric sample, generate a base template from the biometric sample, for example during an enrollment operation, and determine whether recognition biometric samples match with any template, for example during a recognition operation. Additionally, biometric device 119 may be configured to receive a biometric sample, determine whether the biometric sample matches with any base template or derived template, and determine an action corresponding to a matching template. Biometric device 119 may be integrated with device 101 or may be external thereto.

A derived template generation module 128 comprises software that includes instructions that are, for example, integrated with the operating system or configured to be an application operational with the operating system. In some embodiments derived template generation module 128 may comprise firmware, for example, stored in the flash memory 114. The derived template generation module 128 is configured to automatically generate a biometric template derived from a biometric sample or a biometric template. The derived template generation module 128 is also configured to receive a biometric sample, for example during an enrollment operation, generate a base template, determine a directional tolerance, determine a degree of rotation, generate a derived template using the degree of rotation, and store the derived template. Additionally, the derived template generation module 128 is configured to associate a derived template with an action, such that an action corresponding to a matching template of a biometric sample may be identified.

It is noted that derived template generation module 128 is configured to interface with biometric device 119 and applications, such as, but not limited to, calendars, phone lists, task lists, notepads, calculator applications, spreadsheets, games, and a phone application or messaging application. In turn, these applications may interface with the radio subsystem, for example, to receive incoming telephone calls, incoming short message service (SMS), and electronic mail messages.

In one embodiment, central processor 120 executes logic (e.g., by way of programming, code, or instructions) corresponding to executing applications. It is noted that numerous other components and variations are possible to the hardware architecture of the mobile computing device 101, thus an embodiment such as shown by FIG. 1 is illustrative of one implementation for an embodiment.

Radio subsystem 150 includes a transceiver 164. Transceiver 164 may be two separate components for transmitting and receiving signals or a single component for both transmitting and receiving signals. In either instance, it is referenced as transceiver 164. The receiver portion of the transceiver 164 communicatively couples with a radio signal input of device 101, e.g., an antenna, where communication signals are received from an established call (e.g., a connected or on-going call). The received communication signals include voice (or other sound signals) received from the call and processed by the radio processor 160. The transmitter portion of the transceiver 164 communicatively couples a radio signal output of device 101, e.g., the antenna, where communication signals are transmitted to an established (e.g., a connected or active) call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile (or greater), High Speed Download Packet Access (HSDPA), High Speed Uplink Packet Access (HSUPA), and Worldwide Interoperability for Microwave Access (WiMAX).

While other components may be provided with the radio subsystem 150, the basic components shown provide the ability for the mobile computing device to perform radio-frequency communications, including telephonic communications. A radio processor may communicate with central processor 120 using the data line (or bus) 178.

The card interface 124 is adapted to communicate, wirelessly or wired, with external accessories (or peripherals), for example, media cards inserted into the expansion slot (not shown). The card interface 124 transmits data and/or instructions between central processor 120 and an accessory, e.g., an expansion card or media card, coupled within the expansion slot. The card interface 124 also transmits control signals from central processor 120 to the expansion slot to configure the accessory. It is noted that the card interface 124 is described with respect to an expansion card or media card; it also may be structurally configured to couple with other types of devices external to device 101, for example, an inductive charging station for the power supply 140 or a printing device.

FIG. 2 is a process flow diagram for enrollment of biometric information in accordance with an embodiment. The depicted process flow 200 may be carried out by execution of sequences of executable instructions. In another embodiment, various portions of the process flow 200 are carried out by components of a mobile device, an arrangement of hardware logic, e.g., an Application-Specific Integrated Circuit (ASIC), etc. For example, blocks of process flow 200 may be performed by execution of sequences of executable instructions in a derived template generation system and/or a biometric system of the mobile device.

In one embodiment, process flow 200 describes an enrollment operation, which encompasses the original sampling of an individual's biometric information and the creation of a base template that is a data representation of the original sampling and of at least one derived template.

At step 210, a source biometric sample of an individual is determined. As previously described, a biometric sample refers to both raw biometric data (e.g., digital image of a fingerprint) and a digitally processed biometric sample. For example, a scanner of the biometric system captures the biometric sample. In another example, the template matching system receives the source biometric sample, for example, from the biometric system.

At step 220, a base template is generated using the source biometric sample. To generate the base template, relevant features (e.g., characteristics, minutiae, etc.) of the biometric sample are extracted, for example by the biometric system. As used herein, a base template is a template generated from a source biometric sample. The base template is stored, for example in a card, database, and/or other data store in the mobile device, or is stored externally to the mobile device.

A directional tolerance is determined, at step 230. When matching a recognition biometric sample to existing templates, there is some level of tolerance that is allowed to account for differences in the direction or orientation of the biometric samples, for example if a finger is swiped at an angle in relation to the sensor. The directional tolerance may vary, for example, according to the matching methodology employed. In one embodiment, a degree of directional tolerance is determined by the derived template generation system.

A derived template is generated by rotating either a biometric sample or template, for example in incremental degrees so that a recognition biometric sample can be recognized as a match. The match is recognized even though that recognition sample was generated at a different direction or orientation from the template or source sample and is beyond the directional tolerance. For example, a base template may be generated from a finger swipe in a vertical position, whereas a recognition biometric sample is from a horizontal swipe of the same finger. Typically, the recognition biometric sample would not be recognized as a match. By generating derived template(s), the recognition biometric sample may be matched to the same individual even though it is beyond the directional tolerance of the base template.

To generate a derived template, a degree of rotation is determined based on the directional tolerance, at step 240. This degree is used to rotate either a biometric sample or template. The directional tolerance may be represented in terms of degrees (e.g., 45 degrees). A total directional tolerance is determined, for example by summing a left directional tolerance and a right directional tolerance. If the left and right directional tolerances are the same at 45 degrees, the total directional tolerance is 90 degrees. In one embodiment, the degree of rotation is the total directional tolerance.

At step 250, a derived template is generated using the degree of rotation. Either a biometric sample or biometric template is rotated by the degree of rotation. For example, the base template is rotated by the degree of rotation. The result is saved as a derived template. In one embodiment, derived templates are stored along with the base template in a card, database, and/or other data store in the mobile device, or stored externally to the mobile device.

A derived template may be linked with the base template from which it was generated. By linking the derived template to the base template, it is possible to identify the different orientations of biometric samples and to recognize these templates as the same individual.

At step 260, it is determined whether to generate additional derived templates, for example based on a desired directional coverage. A desired directional coverage angle is the minimum angle at which coverage is sought to be achieved by the templates (i.e., base and derived). In one embodiment, it may be determined whether the sum of total directional tolerances of all templates (e.g., base and derived) related to a source biometric sample meets or exceeds the desired directional coverage angle. In another embodiment, it is determined how many templates are needed to provide the desired directional coverage. Continuing with the previous example, if it is desirable to allow a finger swipe in any direction, the coverage angle is 360 degrees. The coverage angle is divided by the total directional tolerance and the result represents the total number of templates (i.e., base and derived) needed to provide the desired coverage. Additionally, the directional tolerance may be rounded in order to multiply evenly into 360 degrees. If additional derived templates are not needed, processing ends. Otherwise, processing continues to step 250 where another derived template is generated.

As such, every time a finger of an individual is enrolled with a single swipe, derived templates are automatically generated. The derived templates address the directionality issue of biometric samples, regardless of the specific matching methodology associated with a biometric system. This obviates the need to separately program the sensor to recognize alternative directions, and thereby increases usability and minimizes user time spent in enrollment.

Figure 2A:
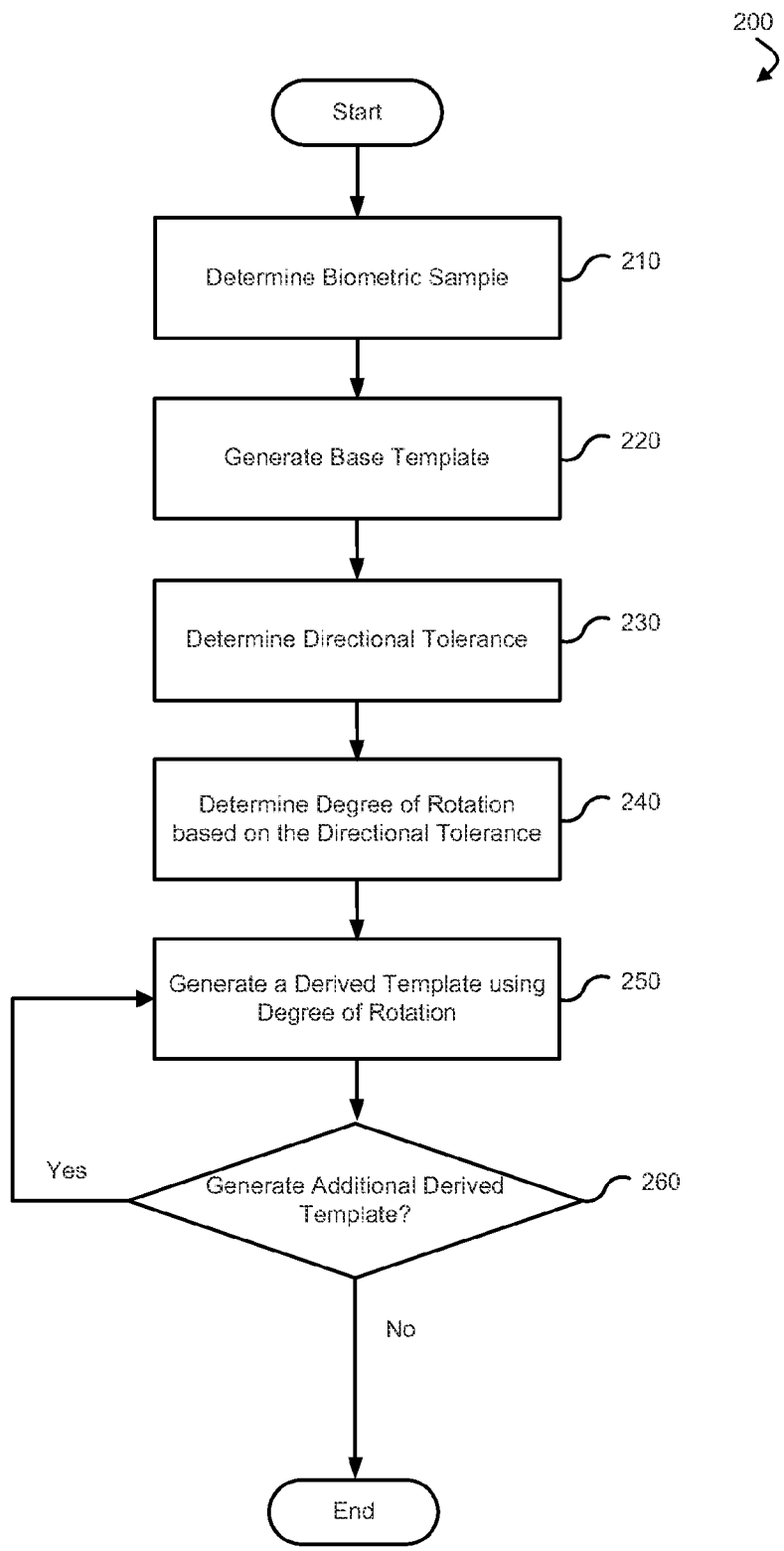
FIG. 2A is a process flow diagram for enrollment of biometric information in accordance with an embodiment.
Figure 2B:
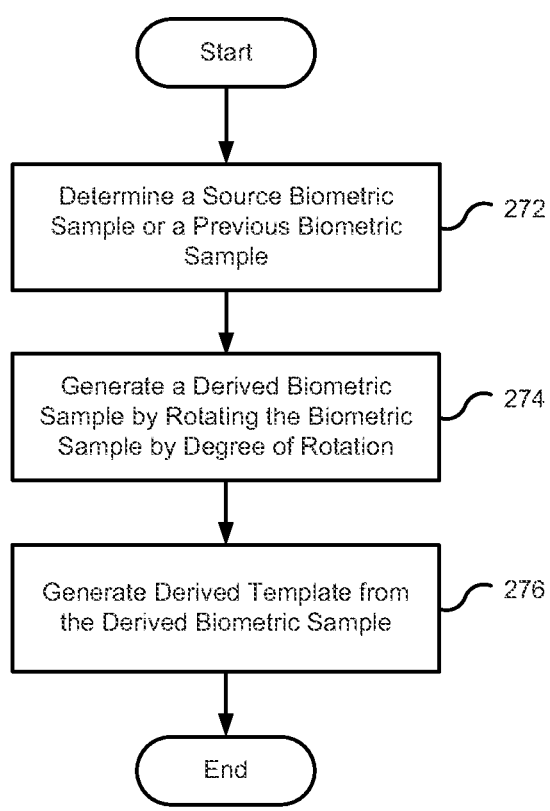
FIG. 2B is a process flow diagram for generating a biometric template derived from a rotated biometric sample in accordance with an embodiment.

FIG. 2B is a process flow diagram for generating a biometric template derived from a rotated biometric sample in accordance with an embodiment. The depicted process flow 270 may be carried out by execution of sequences of executable instructions. In another embodiment, various portions of the process flow 270 are carried out by components of a mobile device, an arrangement of hardware logic, e.g., an Application-Specific Integrated Circuit (ASIC), etc. For example, blocks of process flow 270 may be performed by execution of sequences of executable instructions in a derived template generation system and/or a biometric system of the mobile device.

As previously described with respect to step 250 of FIG. 2A, a derived template is generated from a rotated biometric sample or a rotated template, and multiple derived templates may be generated by iterating through step 250. In one embodiment, process flow 270 describes step 250 in greater detail through the embodiment of generating a derived template from a rotated biometric sample.

At step 272, a source biometric sample or a previous biometric sample is determined. For example, a source biometric sample may be generated from a finger swipe in a vertical position. The previous biometric sample is a source biometric sample that has been rotated by the degree of rotation in a previous iteration of flow 270.

At step 274, the biometric sample (e.g., either the source or a previous biometric sample) is rotated by the degree of rotation, and the result is saved as a derived biometric sample. A derived biometric template is generated from the derived biometric sample, at step 276. In other words, the derived biometric template includes the relevant features extracted from the derived biometric sample. The derived biometric template(s) may then be used in a recognition operation.

Figure 2C:
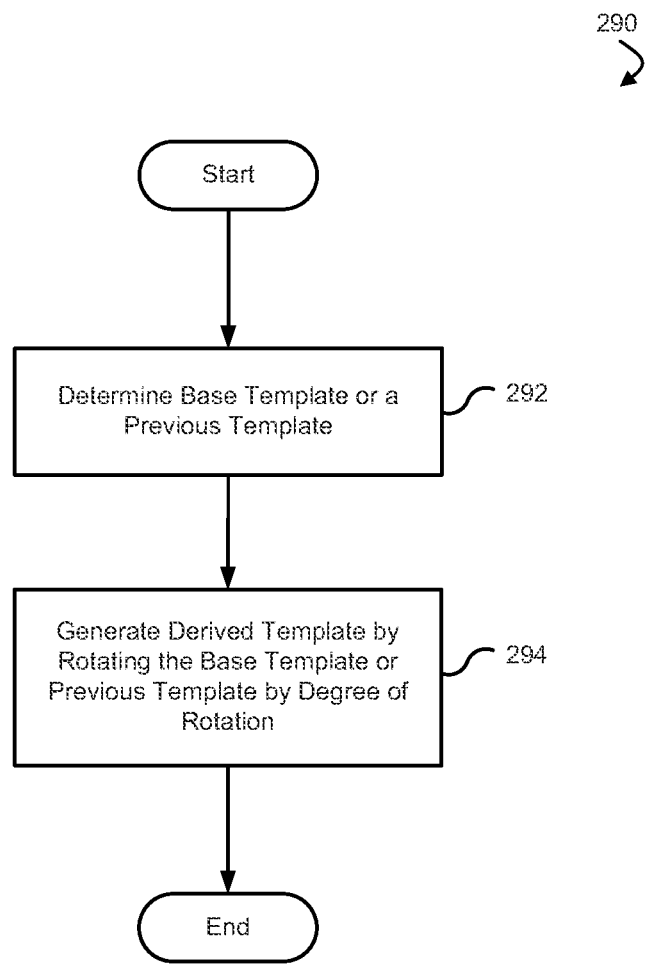
FIG. 2C is a process flow diagram for generating a biometric template derived from a rotated biometric template in accordance with an embodiment.

FIG. 2C is a process flow diagram for generating a biometric template derived from a rotated biometric template in accordance with an embodiment. The depicted process flow 290 may be carried out by execution of sequences of executable instructions. In another embodiment, various portions of the process flow 290 are carried out by components of a mobile device, an arrangement of hardware logic, e.g., an Application-Specific Integrated Circuit (ASIC), etc. For example, blocks of process flow 290 may be performed by execution of sequences of executable instructions in a derived template generation system and/or a biometric system of the mobile device.

As previously described with respect to step 250 of FIG. 2A, a derived template is generated from a rotated biometric sample or a rotated template, and multiple derived templates may be generated by iterating through step 250. In one embodiment, process flow 290 describes step 250 in greater detail through the embodiment of generating a derived template from a rotated biometric template.

At step 292, a base biometric template or a previous biometric template is determined. For example, a base biometric sample may be generated from a source biometric sample. The previous biometric template is a base biometric sample that has been rotated by the degree of rotation in a previous iteration of flow 290.

At step 294, the biometric template (e.g., either the base or previous biometric template) is rotated by the degree of rotation, and the result is saved as a derived biometric template. The derived biometric template(s) may then be used in a recognition operation.

Figure 3:
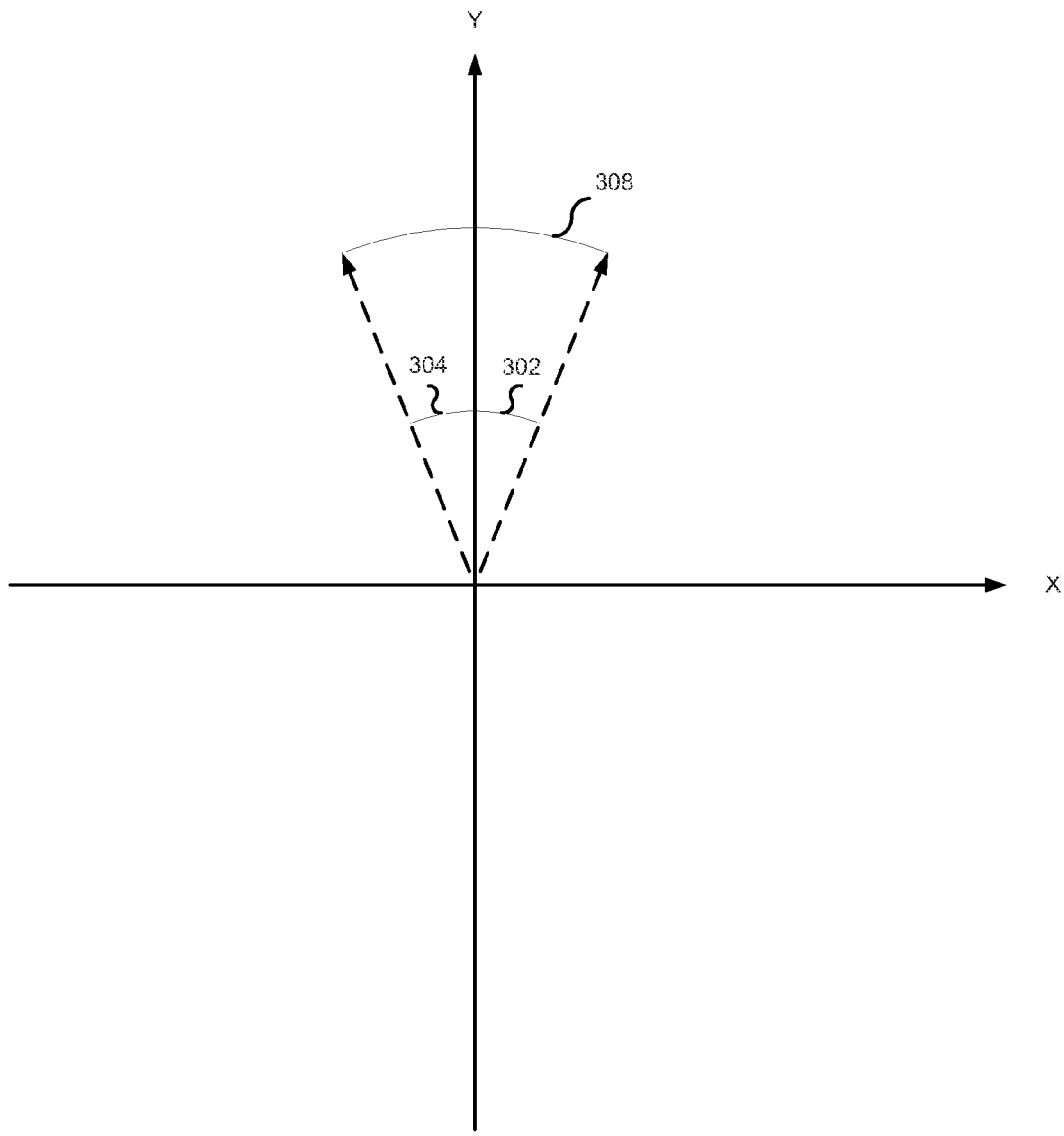
FIG. 3 is a coordinate plane illustrating directional tolerance in accordance with an embodiment.

FIG. 3 is a coordinate plane illustrating directional tolerance in accordance with an embodiment. During enrollment, a base template may be generated from a source biometric sample which is captured through a vertical finger swipe across a sensor of a biometric system. A matching method used by the biometric system may allow a directional tolerance with respect to the base template. As shown, angle 302 represents a sub-directional tolerance by which a recognition biometric sample is aslant to the right of the original biometric sample. Angle 304 represents a sub-directional tolerance by which a recognition biometric sample is aslant to the left of the original biometric sample. A total directional tolerance 308 includes the right and left tolerances as represented by angle 302 and angle 304, respectively.

Figure 4:
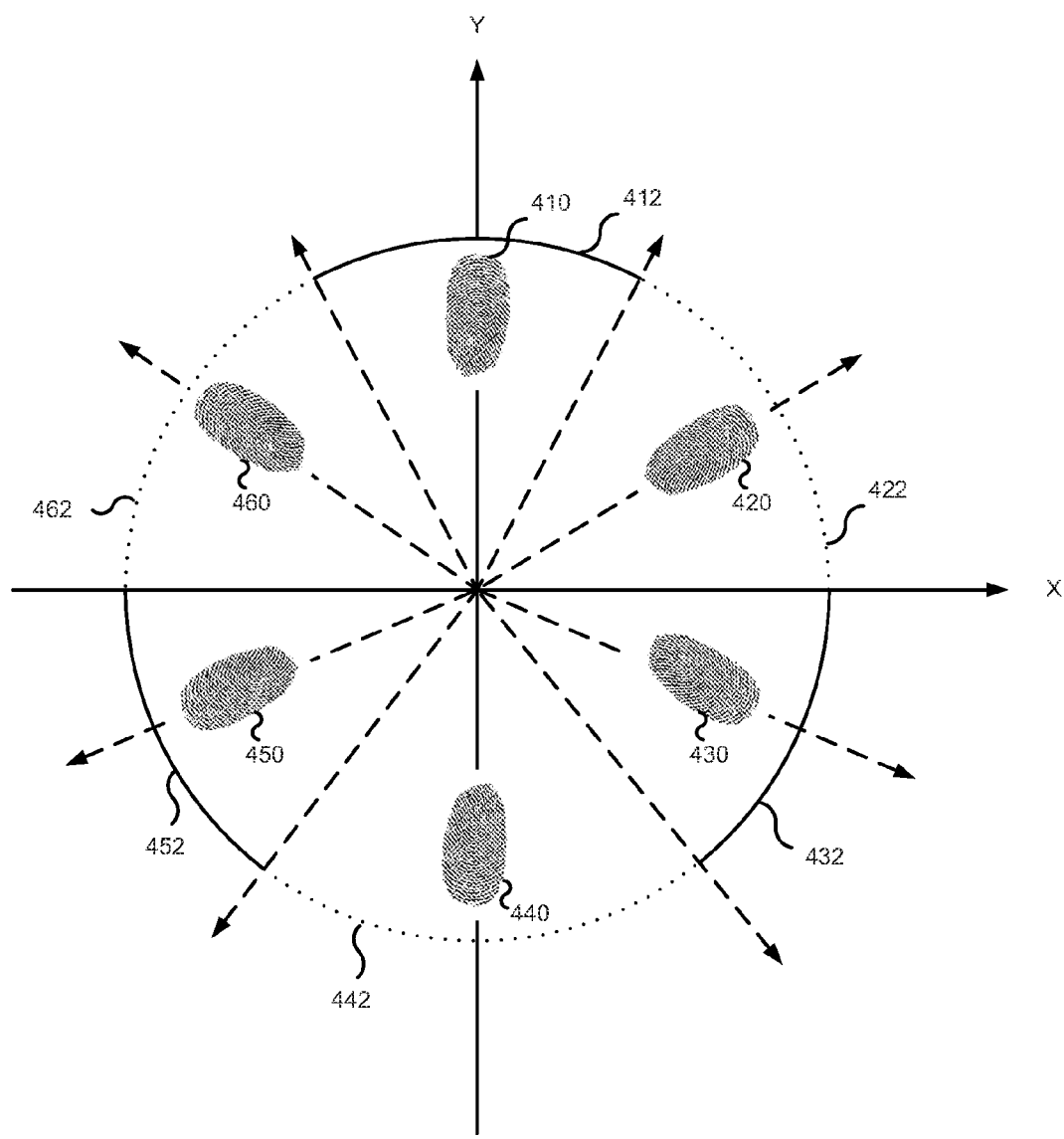
FIG. 4 is a coordinate plane illustrating directional tolerance and degrees of rotation in accordance with an embodiment.

FIG. 4 is a coordinate plane illustrating directional tolerance and degrees of rotation in accordance with an embodiment. During enrollment, a base template 410 is generated from a source biometric sample which is captured through a vertical finger swipe across a sensor of a biometric system. Base template 410 is associated with a total directional tolerance 412 for a particular matching methodology. In other words, subsequent finger swipes are recognized as matching base template 410 even if the swipe is askew as long as it is within total directional tolerance 412. In one embodiment, total directional tolerance 412 is 60 degrees (e.g., 30 degrees for a left directional tolerance and 30 degrees for a right directional tolerance).

A degree of rotation is determined to be 60 degrees, which is the total directional tolerance. In one embodiment, a first derived template 420 is generated by rotating base template 410 by the degree of rotation, i.e., 60 degrees. First derived template 420 is associated with a total directional tolerance 422.

In this example, a desired coverage angle is 360 degrees, which would enable a finger swipe in any direction to be recognized in the matching phase. To provide full coverage, a total of six templates are generated, five of which are derived templates A second derived template 430 is generated by rotating base template 410 by another 60 degrees, for a total of 120 degrees from its original vertical orientation. Second derived template 430 is associated with a total directional tolerance 432. Likewise, a third derived template 440, a fourth derived template 450 and a fifth derived template 460 are generated by rotating base template 410 in increments of 60 degrees. Third derived template 440 is associated with a total directional tolerance 442. Fourth derived template 450 is associated with a total directional tolerance 452 and fifth derived template 460 is associated with a total directional tolerance 462.

In another example, the desired coverage angle is 180 degrees, which would enable finger swipes within 90 degrees to the left and right of the original vertical orientation to be recognized in the matching phase. In this scenario, first derived template 420 is generated by rotating base template 410 by 60 degrees in a clockwise direction. Additionally, derived template 460 is generated by rotating base template 410 from its initial vertical orientation by 60 degrees in a counterclockwise direction. Including the total directional tolerances of all three templates, a 180 degree coverage angle is achieved.

Figure 5:
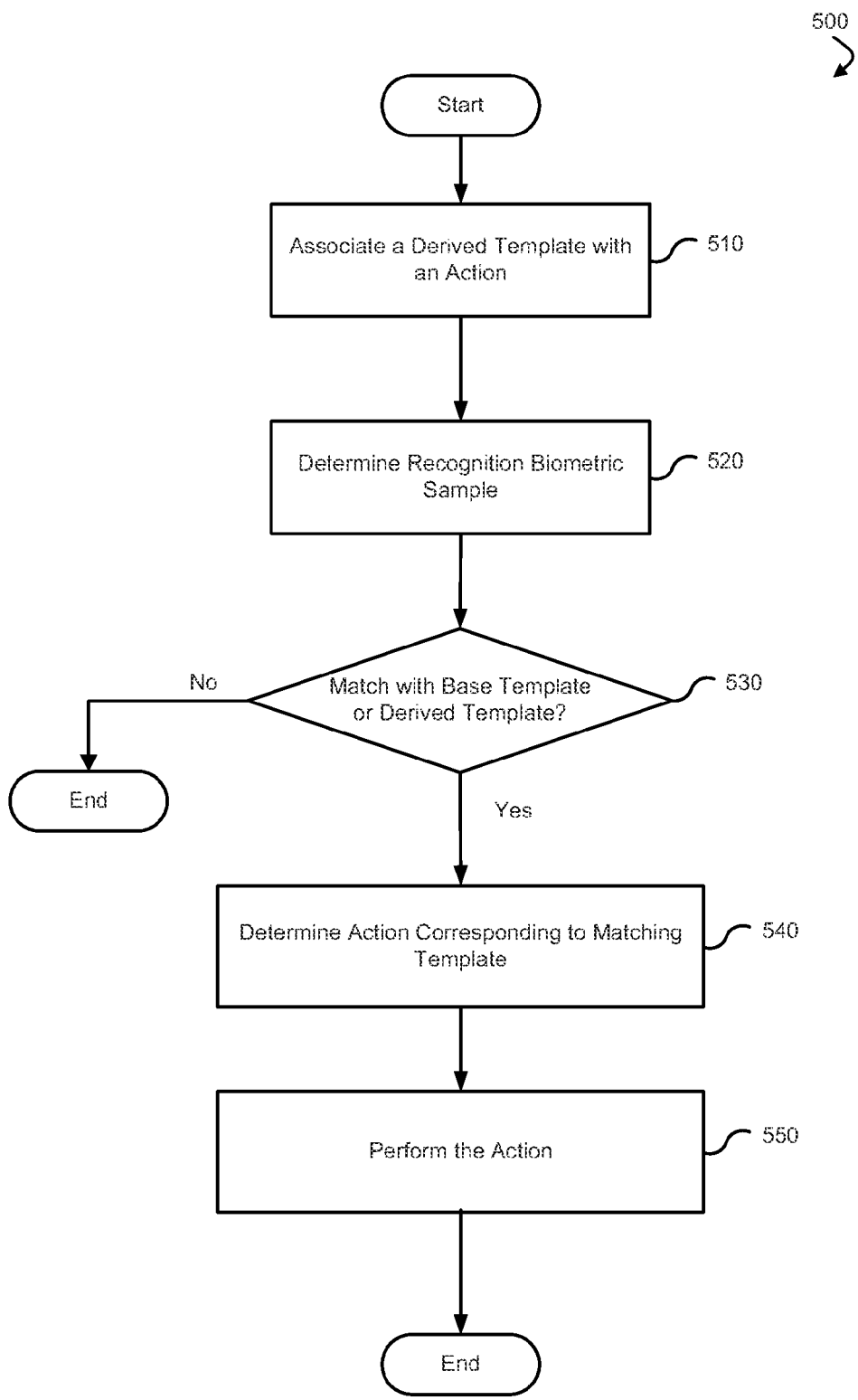
FIG. 5 is a process flow diagram for processing biometric templates in accordance with an embodiment.

FIG. 5 is a process flow diagram for processing biometric templates in accordance with an embodiment. The depicted process flow 500 may be carried out by execution of sequences of executable instructions. In another embodiment, various portions of the process flow 500 are carried out by components of a mobile device, an arrangement of hardware logic, e.g., an Application-Specific Integrated Circuit (ASIC), etc. For example, blocks of process flow 500 may be performed by execution of sequences of executable instructions in a derived template generation system and/or a biometric system of the mobile device.

In one embodiment, a biometric sample of an individual is enrolled and at least one derived template is automatically generated. At step 510, a derived template is associated with an action in a mobile device. This association causes the action to be performed when a recognition biometric sample has features that match the derived template. For example, a base template may be generated from a finger swipe in a vertical position, and a derived template is generated there from. The derived template is intended to capture a right-tilted finger swipe of the same finger that would otherwise not be recognized under typical scenarios. A specific action may be designated for the derived template, such as dialing a home phone number or launching a particular application, which is different from the action associated with the base template. In another embodiment, a specific action may be designated for the collective set including the base template and all of the derived templates which are related thereto. Continuing with the example above, a vertical or a right-tilted finger swipe is associated with the same action, e.g., allowing access to the mobile device. Different actions may be associated with the templates depending on the state of the mobile device. For example, a right-tilted finger swipe may grant access when the device has just been turned-on, and may launch an email application after a user has been authenticated. The association of the derived template with an action may occur during or after an enrollment phase, and may be performed by the derived template generation system.

During a recognition phase, at step 520, a recognition biometric sample is determined by the mobile device. For example, a scanner of the biometric system captures raw biometric data, which is then processed for example to remove artifacts. In another embodiment, the derived template generation system receives the biometric sample.

At step 530, relevant features (e.g., minutiae) of the recognition biometric sample are extracted and compared to the features of the base template and/or the derived template. If the features of the recognition biometric sample do not match any base template or derived template, processing ends.

On the other hand, where the features of the recognition biometric sample are determined to be a match for any one of the base template or derived template, an action corresponding to the matching template is determined at step 540. The matching template may be associated with multiple actions. Continuing with the previous example, a right-tilted finger swipe may grant access when the device has just been turned-on. The same right-tilted finger swipe may launch an email application after a user has been authenticated. To resolve this, at least one of multiple actions are selected based on the state of the mobile device. For example, if the user has already been authenticated, the right-tilted finger swipe may cause an email application to launch. Finally, the corresponding action is performed, at step 550.

By associating with derived templates in this manner, different actions may be performed in response to different swipe directions of the same finger, and/or a same action may be performed for the collective group of related templates.

Figure 6:
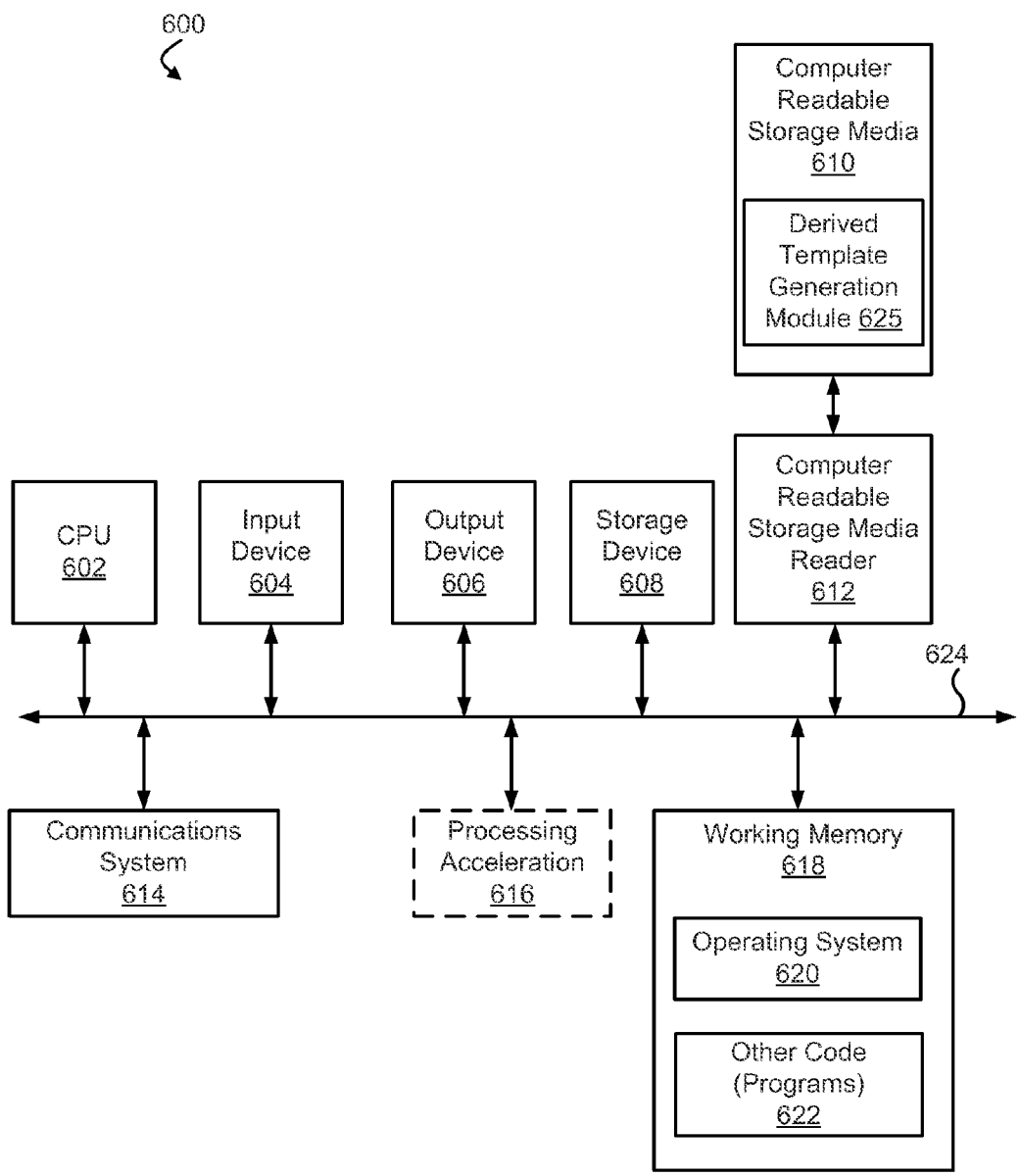
FIG. 6 illustrates a computer system in which an embodiment may be implemented.

FIG. 6 illustrates a computer system in which an embodiment may be implemented. The system 600 may be used to implement any of the computer systems described above. The computer system 600 is shown comprising hardware elements that may be electrically coupled via a bus 624. The hardware elements may include at least one central processing unit (CPU) 602, at least one input device 604, and at least one output device 606. The computer system 600 may also include at least one storage device 608. By way of example, the storage device 608 can include devices such as disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 612, a communications system 614 (e.g., a modem, a network card (wireless or wired), an infra-red communication device, etc.), and working memory 618, which may include RAM and ROM devices as described above. In some embodiments, the computer system 600 may also include a processing acceleration unit 616, which can include a digital signal processor (DSP), a special-purpose processor, and/or the like.

The computer-readable storage media reader 612 can further be connected to a computer-readable storage medium 610, together (and in combination with storage device 608 in one embodiment) comprehensively representing remote, local, fixed, and/or removable storage devices plus any tangible non-transitory storage media, for temporarily and/or more permanently containing, storing, transmitting, and retrieving computer-readable information (e.g., instructions and data). Computer-readable storage medium 610 may be non-transitory such as hardware storage devices (e.g., RAM, ROM, EPROM (erasable programmable ROM), EEPROM (electrically erasable programmable ROM), hard drives, and flash memory). The communications system 614 may permit data to be exchanged with the network and/or any other computer described above with respect to the system 600. Computer-readable storage medium 610 includes a derivative template module 625.

The computer system 600 may also comprise software elements, which are machine readable instructions, shown as being currently located within a working memory 618, including an operating system 620 and/or other code 622, such as an application program (which may be a client application, Web browser, mid-tier application, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

The specification and drawings are, accordingly, to be regarded in an illustrative rather than a restrictive sense. It will, however, be evident that various modifications and changes may be made.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

What is claimed is:

1. A method for generating a biometric template, the method comprising:
   during an enrollment phase:
      determining, by a mobile device, a biometric sample of a user;
      determining a base biometric template based on the biometric sample, wherein the base biometric template includes a plurality of features extracted from the biometric sample;
      determining a directional tolerance associated with the base biometric template;
      determining a degree of rotation based on the directional tolerance;
      generating a derived biometric template using the degree of rotation; and
      storing the base biometric template and the derived biometric template for comparison, during a recognition phase, to a recognition biometric sample of the user,
      wherein the base biometric template is to match the recognition biometric sample in a first orientation, and wherein the derived biometric template is to match the recognition biometric sample in a second orientation.

2. The method of claim 1, wherein the directional tolerance is the degree of allowable difference between a feature of the base biometric template and an extracted feature of a recognition biometric sample.

3. The method of claim 1, wherein generating the derived biometric template comprises:
   rotating the biometric sample by the degree of rotation; and generating the derived biometric template from the rotated biometric sample, wherein the derived biometric template includes a plurality of features extracted from the rotated biometric sample.

4. The method of claim 1, wherein generating the derived biometric template further comprises:
rotating the base biometric template by the degree of rotation; and
generating the derived biometric template from the rotated base biometric template.

5. The method of claim 1, wherein determining the degree of rotation comprises:
determining a plurality of sub-directional tolerances associated with the base biometric template; and
determining a degree of rotation based on at least one of the plurality of sub-directional tolerances.

6. The method of claim 1, further comprising:
determining whether to generate additional derived templates; and
generating a second derived template using the degree of rotation.

7. The method of claim 6, wherein determining whether to generate additional derived templates comprises:
determining a directional coverage angle; and
determining whether a sum of a total directional tolerance of the base template and a total directional tolerance of each derived template is less than the directional coverage angle.

8. The method of claim 6, wherein generating the second derived template comprises:
determining a previous biometric sample, wherein the previous biometric sample is the rotated biometric sample;
rotating the previous biometric sample by the degree of rotation; and
generating the second derived biometric template from the rotated previous biometric sample, wherein the second derived biometric template includes a plurality of features extracted from the rotated previous biometric sample.

9. The method of claim 6, wherein generating the second derived template comprises:
determining a previous biometric template, wherein the previous biometric template is the rotated base biometric template;
rotating the previous biometric template by the degree of rotation; and
generating the second derived biometric template from the rotated previous biometric template.

10. A method for biometric recognition, the method comprising:
during an enrollment phase:
determining, by a mobile device, a degree of rotation associated with a base biometric template, wherein the base biometric template includes a plurality of features extracted from a biometric sample;
generating a derived biometric template using the degree of rotation;
associating a first action of a plurality of actions in the mobile device with the derived biometric template;
storing a plurality of templates in a memory of the mobile device, the plurality of templates comprising the base biometric tem late and the derived biometric template, wherein the base biometric template is to match the recognition biometric sample in a first orientation, and wherein the derived biometric template is to match the recognition biometric sample in a second orientation;

during a recognition phase:
comparing a recognition biometric sample to the plurality of templates stored in the memory of the mobile device;
identifying, based on the comparison, a template of the plurality of templates that matches an extracted feature of the recognition biometric sample; and
determining at least one action of the plurality of actions corresponding to the matching template.

11. The method of claim 10, further comprising:
determining a set of templates related to the biometric sample, the set comprising the base biometric template and the derived template; and
associating a second action of the plurality of actions with the set of templates.

12. The method of claim 10, wherein determining the corresponding action comprises:
determining the matching template is associated with at least two actions of the plurality of actions;
determining a state of the mobile device; and
selecting one of the at least two actions based on the state of the mobile device.

13. The method of claim 1, wherein an extracted feature of the recognition biometric sample matches the base template within a directional tolerance.

14. The method of claim 1, wherein an extracted feature of the recognition biometric sample matches the derived template within a directional tolerance.

15. A non-transitory computer-readable medium storing a plurality of instructions to control a data processor, the plurality of instructions comprising instructions that cause the data processor to:
during an enrollment phase:
determine a biometric sample of a user;
determine a base biometric template, wherein the base biometric template includes a plurality of features extracted from the biometric sample;
determine a directional tolerance associated with the base biometric template;
determine a degree of rotation based on the directional tolerance;
generate a derived biometric template using the degree of rotation; and
store the base biometric template and the derived biometric template for comparison, during a recognition phase, to a recognition biometric sample of the user, wherein the base biometric template is to match the recognition biometric sample in a first orientation, and wherein the derived biometric template is to match the recognition biometric sample in a second orientation.

16. The non-transitory computer-readable medium of claim 15, wherein the directional tolerance is the degree of allowable difference between a feature of the base biometric template and an extracted feature of a recognition biometric sample.

17. The non-transitory computer-readable medium of claim 15, wherein the instructions that cause the data processor to generate the derived biometric template comprise instructions that cause the data processor to:
rotate the biometric sample by the degree of rotation; and
generate the derived biometric template from the rotated biometric sample, wherein the derived biometric template includes a plurality of features extracted from the rotated biometric sample.

18. The non-transitory computer-readable medium of claim 15, wherein the instructions that cause the data processor to generate the derived biometric template comprise instructions that cause the data processor to:
- rotate the base biometric template by the degree of rotation; and
- generate the derived biometric template from the rotated base biometric template.

19. The non-transitory computer-readable medium of claim 15, wherein the plurality of instructions further comprise instructions that cause the data processor to:
- determine whether to generate additional derived templates; and
- generate a second derived template using the degree of rotation.

20. The method of claim 6, wherein generating the second derived template comprises:
- rotating the base biometric template by two or more times the degree of rotation; and
- generating the second derived biometric template from the rotated base biometric template.

* * * * *